US012037813B1

(12) United States Patent
Eid et al.

(10) Patent No.: US 12,037,813 B1
(45) Date of Patent: Jul. 16, 2024

(54) DOOR LOCK OPENING DEVICE

(71) Applicant: Kindoo LLP, Kelowna (CA)

(72) Inventors: Gilbert Eid, Beit Meri (LB); Michael Chaftari, Dubai (AE)

(73) Assignee: Kindoo LLP, Kelowna (CA)

( * ) Notice: Subject to any disclaimer, the term of this patent is extended or adjusted under 35 U.S.C. 154(b) by 0 days.

(21) Appl. No.: 18/509,352

(22) Filed: Nov. 15, 2023

Related U.S. Application Data

(63) Continuation-in-part of application No. 18/142,520, filed on May 2, 2023, now Pat. No. 11,859,408.

(51) Int. Cl.
*E05B 47/00* (2006.01)
*E05B 13/00* (2006.01)
*E05B 15/04* (2006.01)

(52) U.S. Cl.
CPC ........ *E05B 47/0004* (2013.01); *E05B 13/005* (2013.01); *E05B 47/0012* (2013.01); *E05B 2047/0016* (2013.01); *E05B 2047/0017* (2013.01); *E05B 2047/0023* (2013.01); *E05B 2047/0026* (2013.01); *E05B 2047/0037* (2013.01)

(58) Field of Classification Search
CPC ... Y10T 292/82; Y10T 292/85; Y10T 292/93; E05B 1/00; E05B 2047/002; E05B 13/10; E05B 13/101; E05B 17/044; E05B 81/46; E05B 85/06
USPC ........................................... 70/221–224, 277
See application file for complete search history.

(56) References Cited

U.S. PATENT DOCUMENTS

| | | | | | |
|---|---|---|---|---|---|
| 1,005,496 | A | * | 10/1911 | Armbruster | B60R 25/0222 70/189 |
| 1,565,754 | A | * | 12/1925 | Orth | F02N 1/02 292/358 |
| 1,634,845 | A | * | 7/1927 | Netschert | E05B 15/0033 292/358 |
| 2,000,279 | A | * | 5/1935 | Fitz Gerald | E05B 13/108 70/224 |
| 2,450,840 | A | * | 10/1948 | Milligan | E05B 55/005 70/216 |
| 2,497,328 | A | * | 2/1950 | Smith | E05B 55/005 292/169.18 |

(Continued)

FOREIGN PATENT DOCUMENTS

| | | | | |
|---|---|---|---|---|
| EP | 0676518 A2 * | 10/1995 | | |
| WO | WO-9641486 A1 * | 12/1996 | | E05B 47/0012 |

*Primary Examiner* — Carlos Lugo
(74) *Attorney, Agent, or Firm* — Georgiy L. Khayet

(57) ABSTRACT

An opening device for a door lock is provided. The opening device includes a driver rigidly connected to an inside handle, an inside shaft designed to rotate an internal latching mechanism of the door lock, the inside shaft having a follower and a through cavity, an outside shaft designed to be rotated by an outside handle including a first part disposed inside the through cavity of the inside shaft, a second part designed to be engaged with the outside handle, and a gear seat located at an end of the first part. The opening device includes a first gear being permanently rotationally engaged with the inside handle and the driver and configured to slide toward the gear seat, a second gear designed to move along the gear seat, and an electric actuator designed, upon being electrically activated, to cause the first gear to move to and engage the second gear.

22 Claims, 9 Drawing Sheets

(56) References Cited

U.S. PATENT DOCUMENTS

| | | | | | |
|---|---|---|---|---|---|
| 2,497,329 | A * | 2/1950 | Smith | E05C 1/163 | 292/169.14 |
| 3,894,417 | A * | 7/1975 | Taniyama | E05B 47/0661 | 70/156 |
| 3,922,896 | A * | 12/1975 | Kagoura | E05B 55/005 | 70/218 |
| 3,939,679 | A * | 2/1976 | Barker | F41A 17/063 | 341/181 |
| 4,073,527 | A * | 2/1978 | Schlage | E05B 47/068 | 292/144 |
| 4,956,984 | A * | 9/1990 | Chi-Cheng | E05B 47/068 | 70/277 |
| 5,010,752 | A * | 4/1991 | Lin | E05B 47/068 | 70/277 |
| 5,974,912 | A * | 11/1999 | Cheng | E05B 13/101 | 70/279.1 |
| 6,216,500 | B1 * | 4/2001 | Kang | E05B 55/005 | 292/357 |
| 6,334,348 | B1 * | 1/2002 | Ming-Chih | E05B 47/068 | 70/277 |
| 6,807,833 | B1 * | 10/2004 | Huang | E05B 13/101 | 70/217 |
| 6,807,834 | B2 * | 10/2004 | Tsai | E05B 47/068 | 70/279.1 |
| 6,845,642 | B2 * | 1/2005 | Imedio | E05B 47/068 | 70/222 |
| 7,100,407 | B2 * | 9/2006 | Chen | E05B 55/005 | 70/472 |
| 7,168,276 | B2 * | 1/2007 | Errani | E05B 47/0692 | 70/222 |
| 7,523,971 | B2 * | 4/2009 | Ebert | E05B 3/04 | 292/358 |
| 7,543,469 | B1 * | 6/2009 | Tseng | E05B 47/068 | 292/144 |
| 7,918,114 | B2 * | 4/2011 | Walsh, III | E05B 47/0661 | 70/277 |
| 8,006,525 | B2 * | 8/2011 | Huang | E05B 47/068 | 70/279.1 |
| 8,479,544 | B2 * | 7/2013 | Liu | E05B 55/005 | 292/336.3 |
| 8,813,530 | B2 * | 8/2014 | Chiou | E05B 55/005 | 292/336.3 |
| 9,273,489 | B2 * | 3/2016 | Hickman | E05B 15/00 | |
| 2006/0254328 | A1 * | 11/2006 | Pearson | E05B 47/068 | 70/277 |

* cited by examiner

DOOR LOCK OPENING DEVICE

CROSS-REFERENCE TO RELATED APPLICATIONS

This application is a Continuation-in-Part of and claims the priority benefit of U.S. patent application Ser. No. 18/142,520, entitled "DOOR LOCK OPENING DEVICE" and filed on May 2, 2023. The subject matter of the aforementioned application is incorporated herein by reference in its entirety for all purposes.

TECHNICAL FIELD

This disclosure generally relates to the field of door locks and, more particularly, to opening devices for door locks.

BACKGROUND

Doors are typically mounted at the entrance of a building or a room and equipped with door locks that prevent unauthorized entry into the building or the room. Many door locks are opened by rotating, via a handle, a shaft that drives internal latching mechanisms to move latches out of a structure adjacent to the door lock. Generally, the doors are equipped with an inside handle and outside handle. The inside handle is located inside the building or the room that the door protects access to, which can be referred to as the unsecured side of the door. The outside handle is located outside the building or the room, which can be referred to as the secure side of the door. Typically, the door can be opened by rotation of the inside handle. Additionally, the outside handle can be locked by a lock-and-key mechanism or by an electronic locking mechanism, so it cannot open the door lock because rotation of the outside handle is either blocked or the outside handle rotates freely without engaging the internal shaft.

There are known security mechanisms that allow disengaging and engaging the outside handle with an internal latching mechanism, such that the door lock can be opened only when the outside handle is engaged with the internal latching mechanism. However, the existing locking and security mechanisms are located on the secure side of the door, i.e., outside the building or the room the door protects access to. These mechanisms are usually known to be attackable with magnetic devices defeating the internal protection systems. Accordingly, these mechanisms are vulnerable to attacks and attempts to break in from the secure side of the door, i.e., the outside of the door. Therefore, there is a need for a door lock control mechanism that can fit the majority of standard door locks with a secure unlocking mechanism located on the unsecured side of the door.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to an example embodiment, an opening device for a door lock is provided. The opening device may include a driver rigidly connected to an inside handle and an inside shaft designed to rotate an internal latching mechanism of the door lock. The inside shaft may have a follower and a through cavity. The opening device may include an outside shaft designed to be rotated by an outside handle. The outside shaft may include a first part disposed inside the through cavity of the inside shaft, a second part designed to be engaged with the outside handle, and a gear seat located at an end of the first part and outside of the inside shaft. The opening device may include a first gear being permanently rotationally engaged with the inside handle, thereby being permanently rotationally engaged with the driver and configured to slide toward the gear seat. The opening device may include a second gear designed to move along the gear seat and be engageable with the first gear. The opening device may include an electric actuator designed, upon being electrically activated, to cause the first gear to move to the second gear, thereby engaging the first gear with the second gear. When the first gear and the second gear are engaged and the outside shaft is rotated, the second gear may cause the driver to engage the follower of the inside shaft, thereby causing the inside shaft to rotate the internal latching mechanism of the door lock.

According to another example embodiment, a method for manufacturing an opening device for a door lock is provided. The method may include providing a driver rigidly connected to an inside handle. The method may include providing an inside shaft designed to rotate an internal latching mechanism of the door lock. The inside shaft may have a follower and a through cavity. The method may include providing an outside shaft designed to be rotated by an outside handle. The outside shaft may include a first part disposed inside the through cavity of the inside shaft, a second part designed to be engaged with the outside handle and a gear seat located at end of the first part and outside of the inside shaft. The method may include providing a first gear being permanently engaged in rotation with the inside handle, thereby being permanently engaged rotationally with the driver and configured to be able to slide toward the gear seat. The method may include providing a second gear designed to move along the gear seat and be engageable with the first gear. The method may include providing an electric actuator designed, upon being electrically activated, to cause the first gear to move to the second gear, thereby engaging the first gear with the second gear. When the first gear and the second gear are engaged and the outside shaft is rotated, the second gear may cause the driver to engage the follower of the inside shaft, thereby causing the inside shaft to rotate the internal latching mechanism of the door lock.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1A:
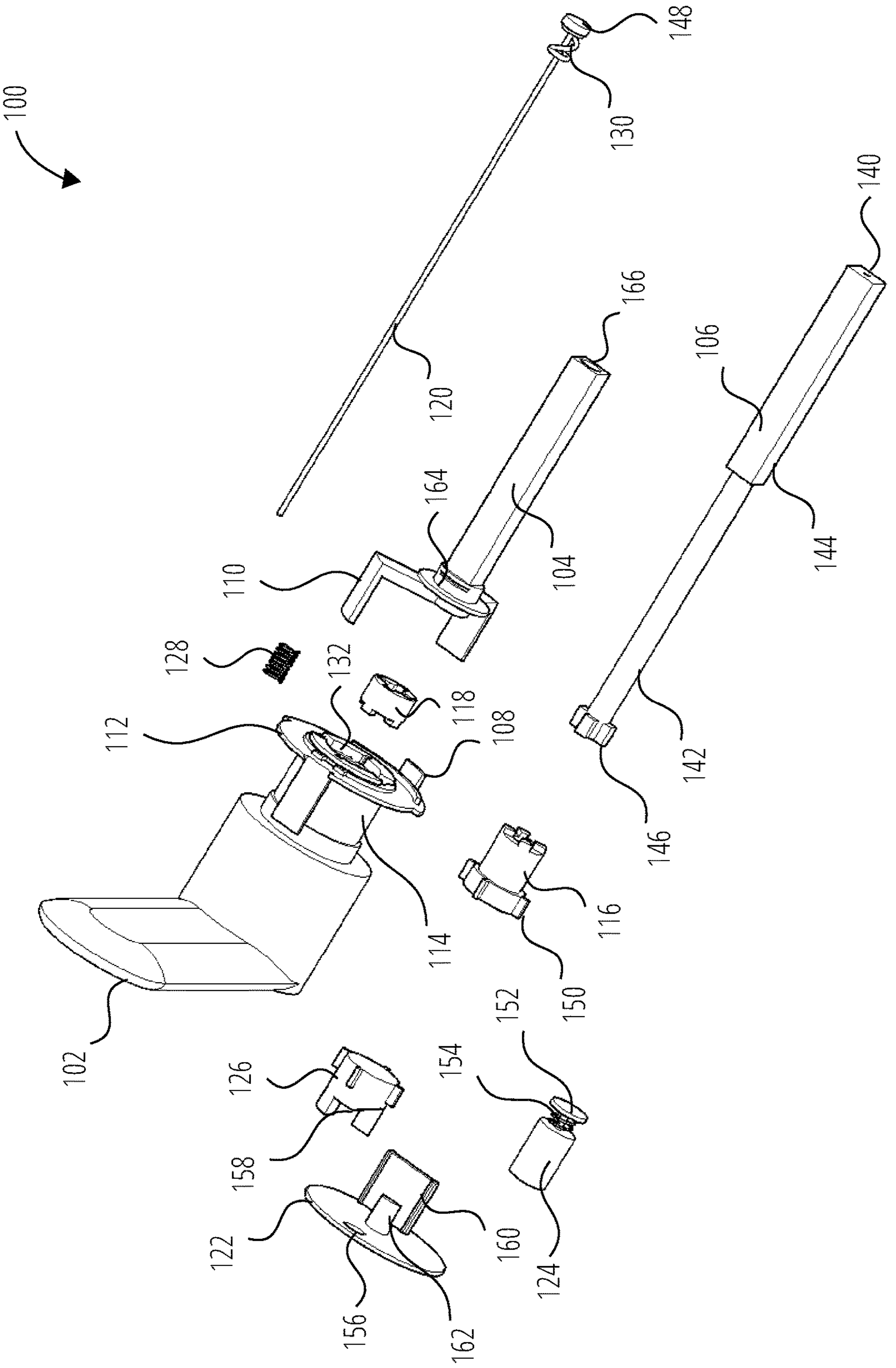
FIG. 1A shows an exploded view of an opening device, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Embodiments of this disclosure generally relate to opening devices for door locks. Some embodiments of the present disclosure solve issues of existing opening mechanisms for door locks. Certain embodiments of the present disclosure may provide a mechanism for opening the door lock. The mechanism for opening the door locks can be arranged inside a building or room protected by the door. At the same time, the mechanism for opening the door lock can be driven by an outside handle located outside the building or the room after the outside handle is engaged with the mechanism. Therefore, these embodiments of the present disclosure may protect the mechanisms for opening the door locks from outside attacks and attempts to break in, thereby increasing security of the door locks and preventing unauthorized access to the buildings and the rooms.

According to an example embodiment, an opening device for a door lock may include a driver rigidly connected to an inside handle and an inside shaft designed to rotate an internal latching mechanism of the door lock. The inside shaft may have a follower and a through cavity. The opening device may include an outside shaft designed to be rotated by an outside handle. The outside shaft may include a first part disposed inside the through cavity of the inside shaft, a second part designed to be engaged with the outside handle, and a gear seat located at an end of the first part and outside of the inside shaft. The opening device may include a first gear being permanently rotationally engaged with the inside handle, thereby being permanently rotationally engaged with the driver and configured to slide toward the gear seat. The opening device may include a second gear designed to move along the gear seat and be engageable with the first gear. The opening device may include an electric actuator designed, upon being electrically activated, to cause the first gear to move to the second gear, thereby engaging the first gear with the second gear. When the first gear and the second gear are engaged and the outside shaft is rotated, the second gear may cause the driver to engage the follower of the inside shaft, thereby causing the inside shaft to rotate the internal latching mechanism of the door lock. The electric actuator, upon being electrically deactivated, may release the first gear allowing for a spring to push the first gear away from the second gear and to disengage the first gear from the second gear. When the first gear and the second gear are disengaged and the outside shaft is rotated, the second gear may not rotate and the internal latching mechanism of the door lock remains locked.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

Figure 1B:
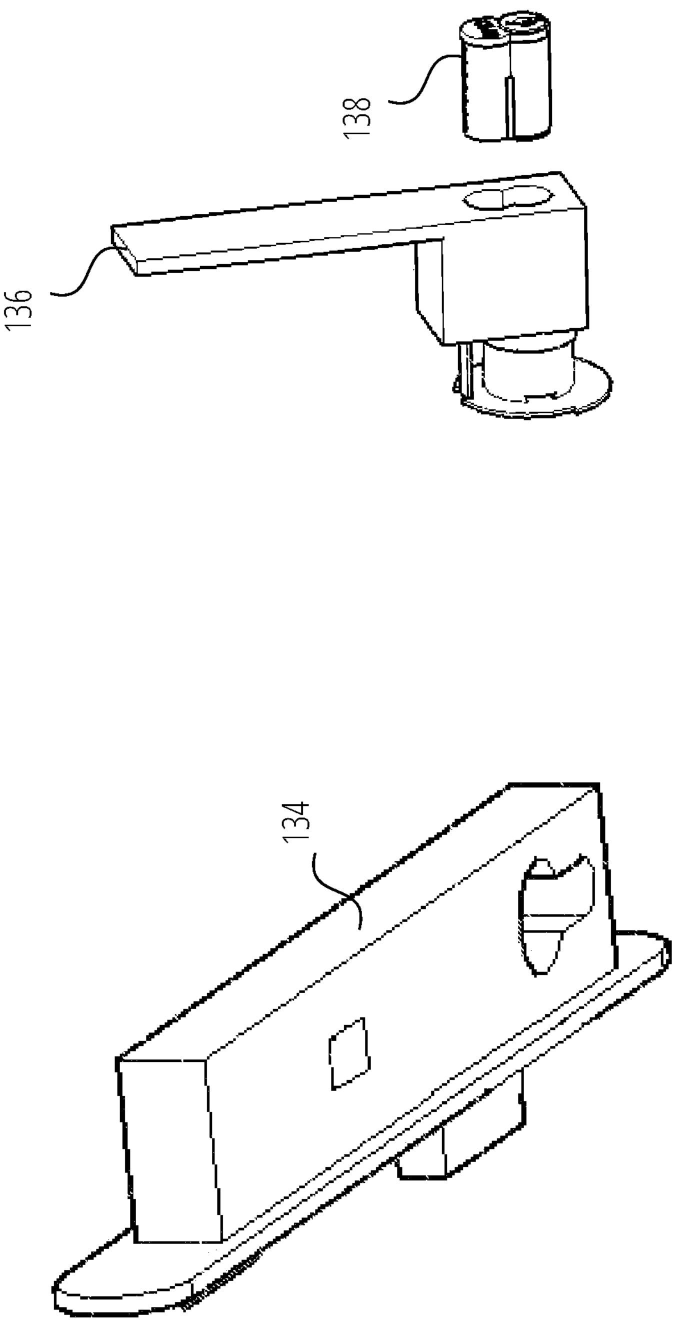
FIG. 1B illustrates a door lock and an outside handle of an opening device, according to an example embodiment.

Referring now to the drawings, FIG. 1A shows an exploded view of an opening device 100, according to an example embodiment. FIG. 1B illustrates a door lock and an outside handle of the opening device 100, according to an example embodiment.

The opening device 100 may include an inside handle 102, an inside shaft 104, an outside shaft 106, a driver 108, a follower 110, a disk 112, a tube 114, a first gear 116, a second gear 118, a rod 120, a control dial 122, a blade 160, an insert 126, a latching solenoid 124, a spring 128, and a spring 130.

Driver 108 can be rigidly attached to the external circumference of disk 112. The first gear 116 can be located at the center of disk 112. The first gear 116 can be permanently engaged in rotation with disk 112. First gear 116 can slide along the direction of tube 114 and be partially located inside internal cavity 132 of tube 114. Tube 114 can be rigidly attached to disk 112. Tube 114 can be rigidly attached to the inside handle 102. Thus, when inside handle 102 is rotating, driver 108 rotates in the direction of rotation of the inside handle 102.

The follower 110 can be rigidly connected to inside shaft 104. The inside shaft 104 can be engaged with the internal latching mechanism of a door lock 134. When driver 108 engages follower 110 and keeps rotating, it causes the inside shaft 104 to rotate in the same direction as inside handle 102. While rotating, inside shaft 104 can drive the internal latching mechanism to unlock the door lock 134.

The outside shaft 106 can be engaged and rotated with outside handle 136. Lock-and-key mechanism 138 can be integrated into the outside handle 136 (shown in FIG. 1B). Lock-and-key mechanism 138 can be designed to receive a door key (not shown) and can allow unlocking the outside handle 136 when the door key is rotated by a pre-determined angle.

Inside shaft 104 may have a through cavity 166. The outside shaft 106 may include a cylindrical part 142 (also referred to as a first part), a polyhedral part 144 (also referred to as a second part), and gear seat 146. When the opening device 100 is in assembly, cylindrical part 142 is disposed within through cavity 166 and the gear seat 146 is disposed outside the inside shaft 104. When in the assembly, outside shaft 106 and inside shaft 104 can be allowed to rotate independently of each other around a common axis of rotation.

Outside shaft 106 may have through cavity 140. When the opening device 100 is in assembly, rod 120 is disposed within the through cavity 140 while a rod thickening 148 and a spring 130 are located outside of the through cavity 140.

Rod thickening 148 can be located at the end of rod 120. Spring 130 can be wound around rod 120 at rod thickening 148.

Second gear 118 can be designed to move along gear seat 146 of the outside shaft 106. Second gear 118 can be engaged with first gear 116 while still being engaged with gear seat 146. The shape and number of gear teeth of first gear 116, gear seat 146, and second gear 118 can be different from the ones shown in FIG. 1A. When second gear 118 is engaged with first gear 116, rotation of the gear seat 146 (caused by rotation of outside shaft 106) may cause rotation of first gear 116, and, in turn, rotation of inside handle 102, tube 114, disk 112 and driver 108. To ensure the rotation of inside handle 102, tube 114, disk 112 and driver 108, first gear 116 may have external teeth 150 matching grooves of internal cavity 132 of the tube 114. When driver 108 engages with follower 110, it causes rotation of the inside shaft 104, thereby opening the door lock 134. When second gear 118 is not engaged with first gear 116, rotation of outside shaft 106 will not result in rotation of first gear 116, inside handle 102, tube 114, disk 112, or driver 108. To be engaged with each other, first gear 116 can be moved toward second gear 118 or, vice versa, the second gear 118 can be moved toward first gear 116.

The opening device 100 may include an electric actuator located inside tube 114 of the inside handle 102 that can cause the first gear 116 to move toward the second gear 118 and engage second gear 118. In example of FIG. 1A, the electric actuator is latching solenoid 124. The latching solenoid 124 may include a plunger 152 and a spring 154.

The opening device 100 may further include an electronic circuit. The electronic circuit may include a receiver, a microprocessor, and a battery. The electronic circuit can provide an electric current to the latching solenoid 124 in response to receiving a signal or a code. Upon receiving the electric current in a first direction, the latching solenoid 124 can be activated. Upon receiving the electric current in a second direction opposite to the first direction, the latching solenoid 124 can be deactivated.

Figure 2:
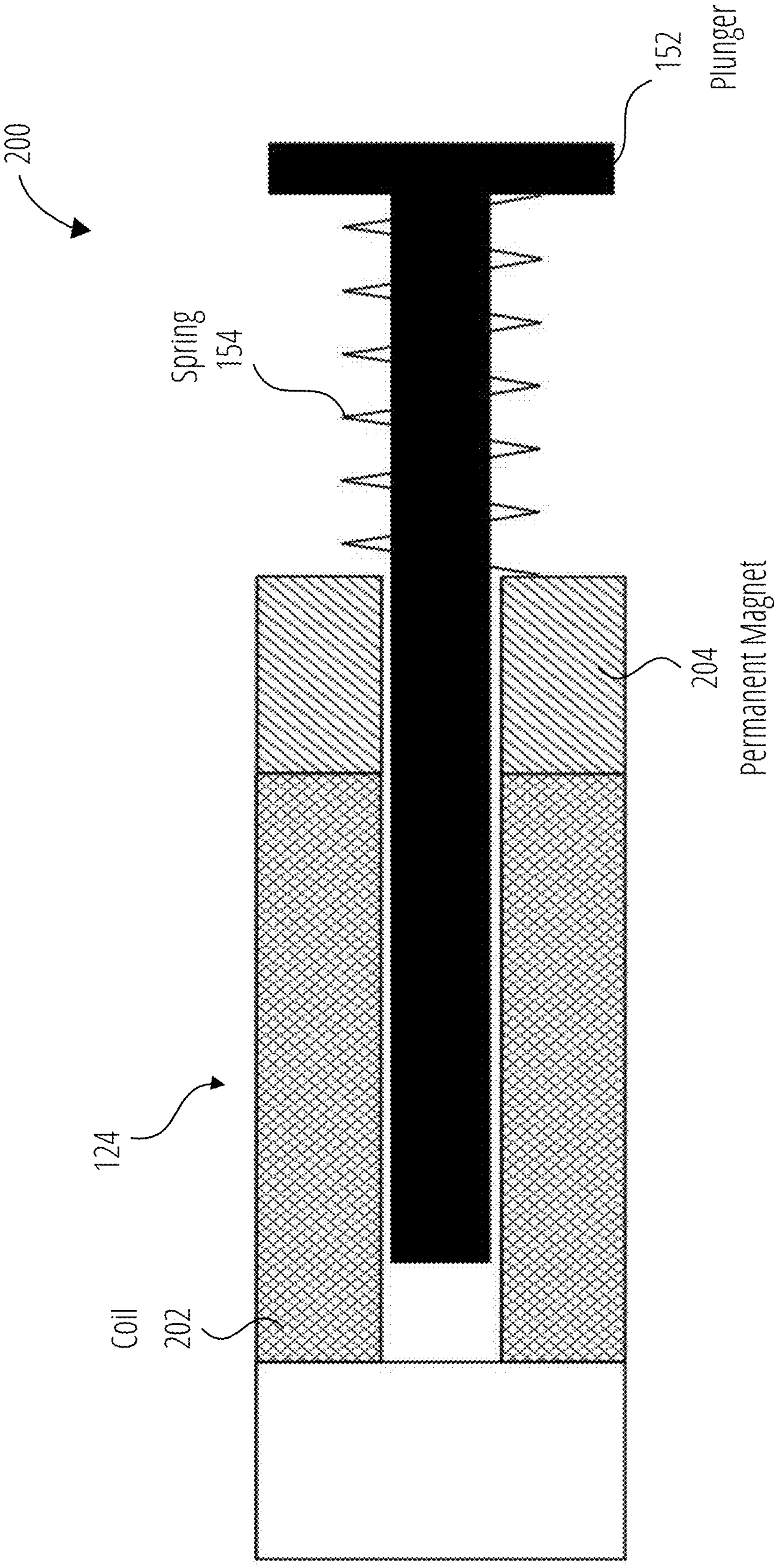
FIG. 2 is a schematic cross-section view of a latching solenoid in an activated mode, according to some example embodiments.

FIG. 2 is a schematic cross-section view 200 of the latching solenoid 124 in an activated mode, according to some example embodiments. Latching solenoid 124 may include coil 202, permanent magnet 204, plunger 152, and spring 154. The plunger can be made of metal and can slide along cavity formed by the coil and permanent magnet 204. The magnetic field of permanent magnet 204 generates a pull force that pulls plunger 152 towards coil 202 and away from first gear 116 (shown in FIG. 1A).

Coil 202, when powered by electric current of the first direction, pushes plunger towards permanent magnet 204 and first gear 116, thereby moving first gear 116 toward second gear 118 to engage second gear 118. Spring 154 pushes plunger 152 away from the cavity of coil 202 and toward first gear 116. After plunger 152 is pushed as shown in FIG. 2, the coil 202 is no longer powered by electric current. The position of the plunger 152 is held by the push force of the spring 154 because the push force of the spring 154 is stronger than the pull force generated by permanent magnet 204. This is made possible by the fact that the force exercised by the permanent magnet 204 drops very quickly as the plunger 152 moves away from the cavity formed by coil 202 and permanent magnet 204.

Figure 3:
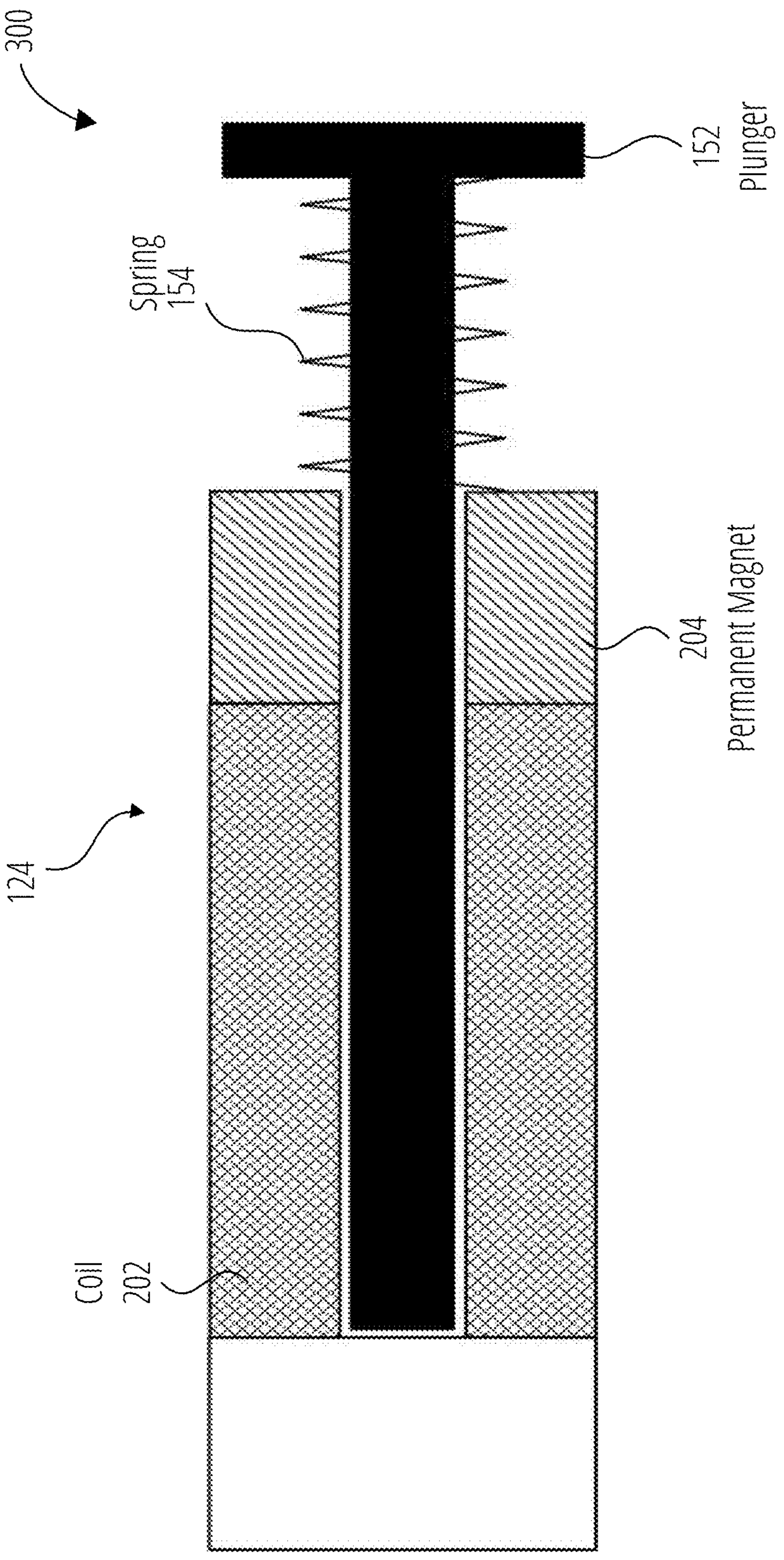
FIG. 3 is a schematic cross-section view of a latching solenoid in a deactivated mode, according to some example embodiments.

FIG. 3 is a schematic cross-section view 300 of the latching solenoid 124 in a deactivated mode, according to some example embodiments. Latching solenoid 124 may include coil 202, permanent magnet 204, plunger 152, and spring 154. Coil 202, when powered by electric current of the second direction opposite to the first direction, pulls plunger 152 away from the first gear 116 (shown in FIG. 1A), thereby allowing first gear 116 to disengage the second gear 118 (shown in FIG. 1A). Spring 128 (shown in FIG. 1A) can be placed between first gear 116 and second gear 118 to move first gear 116 away from second gear 118 when plunger 152 does not support first gear 116. In some embodiments, plunger 152 can be rigidly connected to first gear 116. In these embodiments, first gear 116 can be moved away from second gear 118 directly by plunger 152.

After plunger 152 is pulled back towards coil 202, as shown in FIG. 2, coil 202 is no longer powered by electric current. The position of plunger 152 is held by the pull force generated by permanent magnet 204 because in this position of plunger 152 the pull force generated by permanent magnet 204 is stronger than the push force of spring 154.

Thus, to transition the latching solenoid 124 from one mode to another, the coil 202 can be powered with a short pulse. This may increase lifetime of battery powering the electric circuit of the opening device 100.

Referring back to FIG. 1A, in some embodiments the electric actuator may include an electric motor with a drive screw-and-nut system instead of latching solenoid 124, electric motor.

Figure 4:
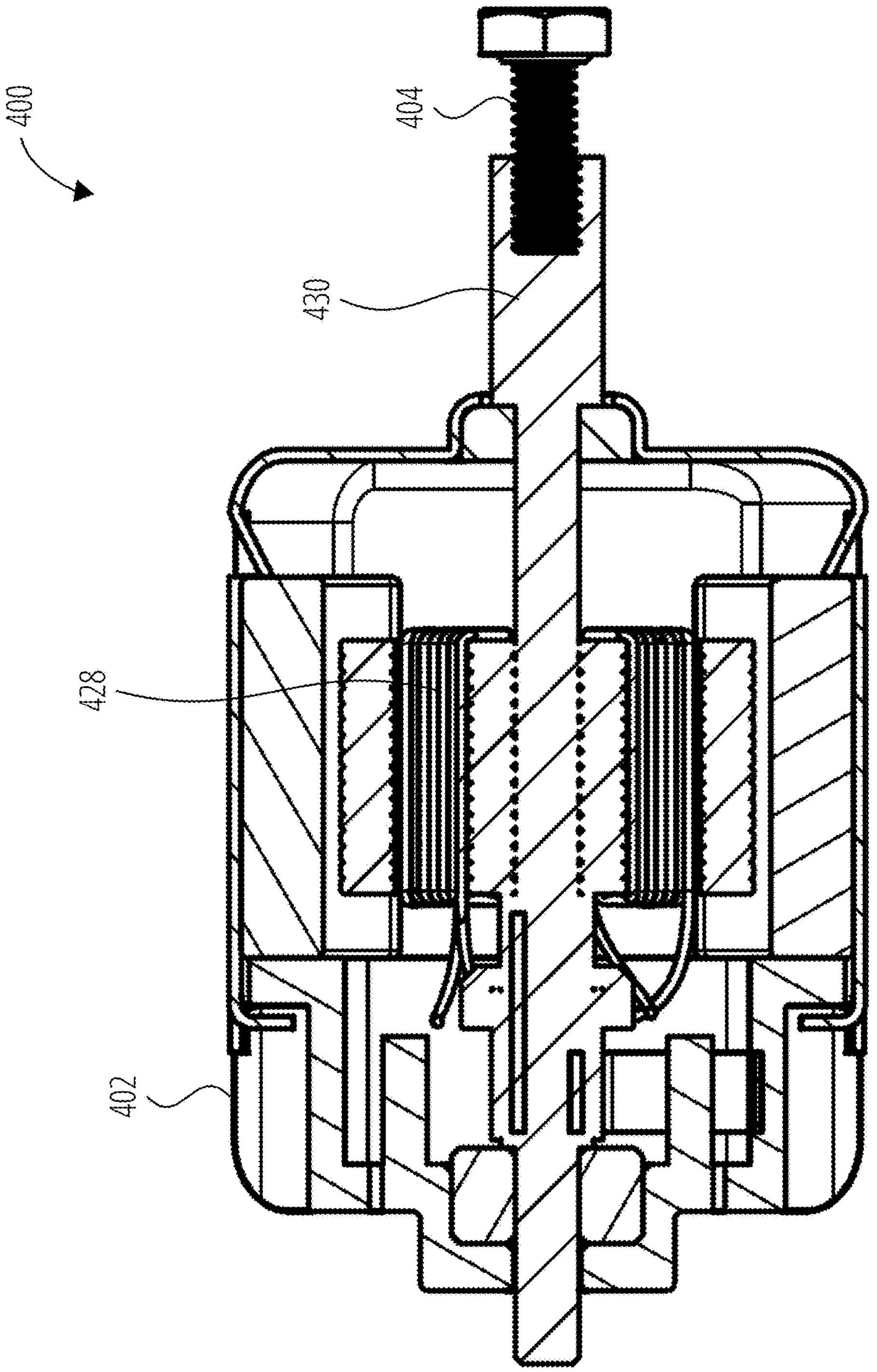
FIG. 4 shows an electric motor, according to some example embodiments.

FIG. 4 shows an electric motor 400, according to some example embodiments. Electric motor 400 may include a motor coil 428, a nut 430, body 402, and a drive screw 404.

The electronic circuit can provide an electric current to the electric motor 400 in response to receiving a signal or a code. Upon receiving the electric current in a first direction, the nut 430 of the electric motor 400 rotates in a first rotational direction to force the drive screw 404 to move from body 402 of the electric motor 400. Upon receiving the electric current in a second direction opposite to the first direction, the nut 430 of the electric motor 400 rotates in a second rotational direction to force the drive screw 404 to move towards body 402 of the electric motor 400.

When the electric motor 400 receives electric current in the first direction, drive screw 404 can move first gear 116 toward second gear 118 (shown in FIG. 1A) to engage second gear 118. After first gear 116 engages with second gear 118, the electric circuit can stop providing the electric current to electric motor 400. Drive screw 404 may support the first gear 116 in engagement with second gear 118 until electric motor 400 is powered by electric current in the second direction opposite to the first direction.

When electric motor 400 receives electric current in the second direction, the drive screw 404 can move away of first gear 116, thereby allowing first gear 116 to move away from and disengage second gear 118. Spring 128 (shown in FIG. 1A) can be placed between first gear 116 and second gear 118 to move first gear 116 away from second gear 118 when drive screw 404 does not support the position of first gear 116.

After drive screw 404 retreats back to the body 402 of electric motor 400, the electronic circuit of the opening device 100 may stop providing the electric current to electric motor 400. When the electric motor 400 is not powered, the nut 430 and the drive screw 404 may maintain their position due to the surface friction. Thus, electric motor 400 is powered only for a short time when drive screw 404 extends from or retreats to body 402 of electric motor 400. This may increase lifetime of battery powering the electric circuit of the opening device 100.

Referring back to FIG. 1A, it should be noted that second gear 118, first gear 116, gear seat 146, the electric actuator (either latching solenoid 124 or electric motor 400), driver 108, and follower 110 can be arranged on the unsecure side of a door, i.e., inside a building or a door protected by the door lock 134. This arrangement allows lowering vulnerability of opening device 100 against attacks from outside the building or the room.

The control dial 122 can be rotated on the surface of the inside handle 102 to insert 126 to slide along internal cavity 132 of tube 114. A user can rotate control dial 122 by inserting a finger or a pin into hole 156. To allow sliding of insert 126 in response to the rotation of control dial 122, insert 126 may include a sloped back side 158 engaged with blade 160. Blade 160 can be connected with control dial 122 via rod 162. Both rod 162 and blade 160 can be located inside the internal cavity 132 of tube 114. When control dial 122 is turned in the first direction, insert 126 pushes electric actuator (for example, latching solenoid 124) toward first gear 116, thereby causing first gear 116 to move toward and engage second gear 118. First gear 116 and second gear 118 remain engaged until control dial 122 is turned in a second direction opposite to the first direction. When control dial 122 is turned in the second direction, spring 128 located between first gear 116 and second gear moves first gear 116 outward second gear 118, thereby disengaging first gear 116 and second gear 118.

In some embodiments, the second gear 118 can be moved toward and engaged with first gear 116. Specifically, the second gear 118 can be engaged with first gear 116 by a door key (not shown) inserted into lock-and-key mechanism 138 (shown in FIG. 1B). When inserted, the door key may push rod thickening 148, thereby causing rod 120 to move along the through cavity 140 of outside shaft 106 and move second gear 118 to be engaged with first gear 116.

In some embodiments, rod 120 can be rigidly connected to second gear 118. In these embodiments, when the door key is pulled out from lock-and-key mechanism 138, spring 130 may expand, allowing rod 120 to move second gear 118 away from first gear 116 to disengage second gear 118 and first gear 116.

In some embodiments, rod 120 is not rigidly connected to the second gear 118. In these embodiments, when the door key is pulled out from lock-and-key mechanism 138, the spring 128 located between the first gear 116 and second gear 118 can move the second gear 118 and the first gear 116 away from each other.

Figure 5:
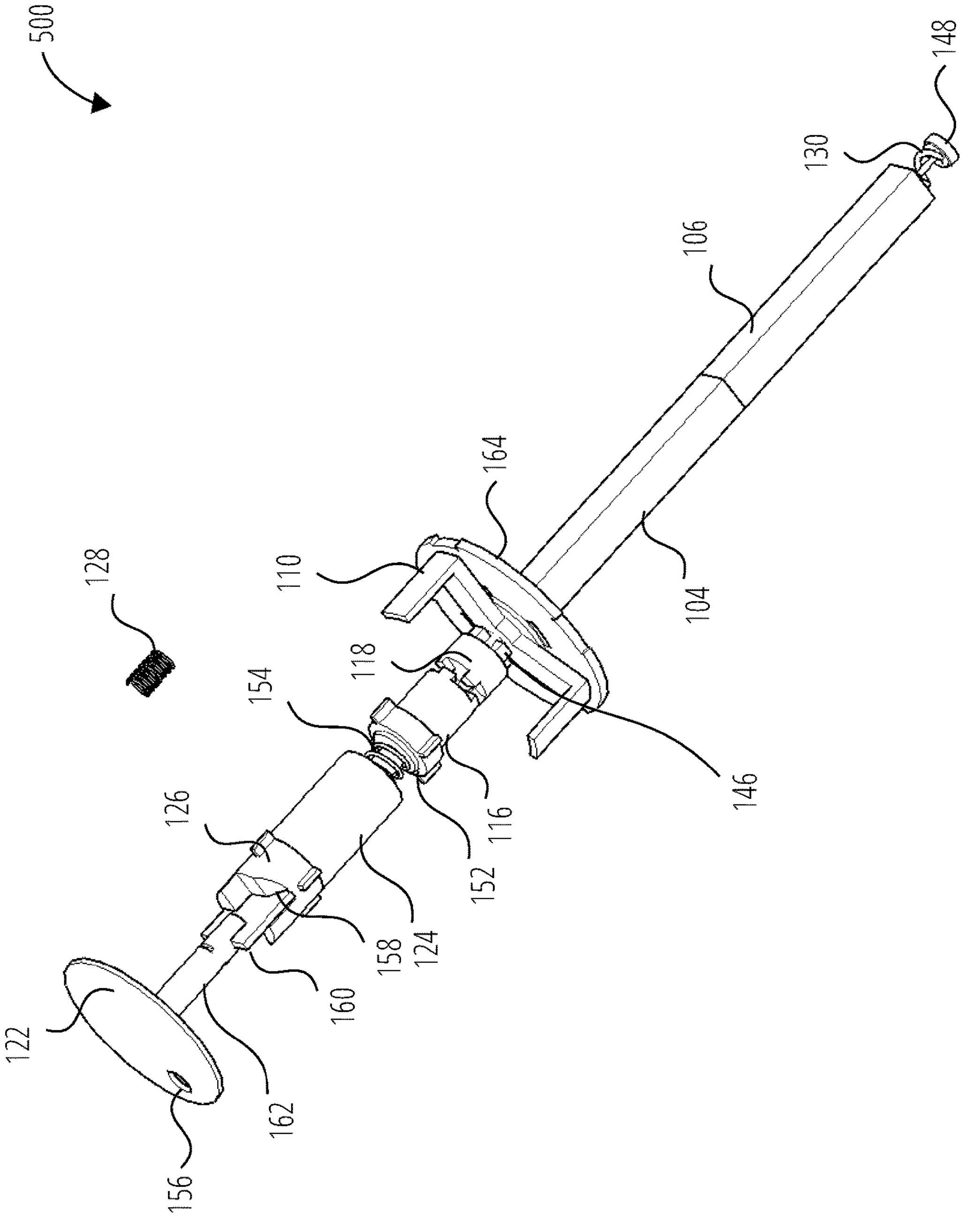
FIG. 5 is a view of an opening device in a mode disallowing opening a door lock from outside, according to an example embodiment.

FIG. 5 is a view 500 of an opening device 100 in a mode disallowing opening a door lock from outside, according to an example embodiment. Opening device 100 includes a control dial 122 with a hole 156, a spring 128, a spring 130, a rod thickening 148, an outside shaft 106, a gear seat 146, a first gear 116, a sloped back side 158, an inside shaft 104, a disk 164, a follower 110, a second gear 118, a blade 160, a latching solenoid 124, a plunger 152, a spring 154, an insert 126 with a sloped back side 158, and a rod 162.

In FIG. 5, second gear 118 is not engaged with first gear 116 because, for example, the latching solenoid 124 is not provided with an electric current to move first gear 116 toward second gear 118. Accordingly, rotation of outside shaft 106 cannot cause rotation of the first gear 116, disk 112 (shown in FIG. 1A), driver 108 (shown in FIG. 1A), and inside shaft 104. Therefore, door lock 134 (shown in FIG. 1B) cannot be unlocked from outside using outside handle 136 (shown in FIG. 1B).

In the mode disallowing opening a door lock from outside, door lock 134 can be unlocked by rotating inside handle 102 (shown in FIG. 1A). When the inside handle 102 rotates, it causes, via tube 114 and disk 112, rotation of driver 108. Driver 108 may engage with follower 110 to cause rotation of inside shaft 104. The rotation of inside shaft 104 may cause the internal latching mechanism of door lock 134 to unlock the door lock 134. In some embodiments, the opening device 100 may include a returning spring (not shown) disposed around follower 110. The returning spring may expand and rotate the inside shaft 104 back to an initial position.

Figure 6:
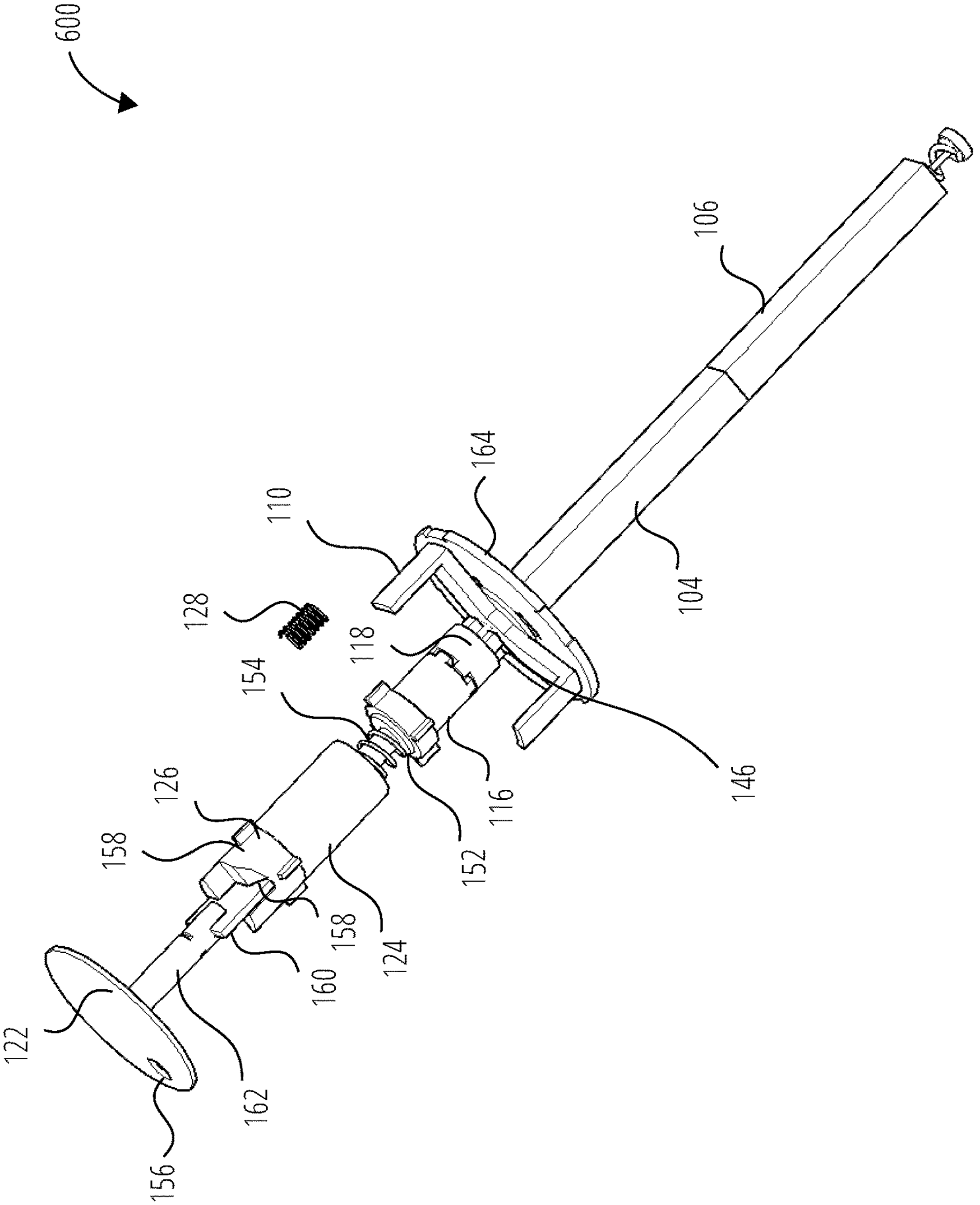
FIG. 6 is a view of an opening device in a mode allowing opening a door lock from outside, according to an example embodiment.

FIG. 6 is a view 600 of an opening device 100 in a mode allowing opening a door lock from outside, according to an example embodiment. The opening device 100 includes a control dial 122 with a hole 156, a spring 128, an outside shaft 106, a gear seat 146, a first gear 116, an inside shaft 104, a disk 164, a follower 110, a second gear 118, a blade 160, a latching solenoid 124, a plunger 152, a spring 154, an insert 126 with sloped back side 158, a hole 156, and a rod 162.

In FIG. 6, first gear 116 is engaged with second gear 118, for example, by latching solenoid 124. Accordingly, rotation of outside shaft 106 may cause rotation of the first gear 116, disk 112, and driver 108 (shown in FIG. 1A). As a result, driver 108 may engage with follower 110 to cause rotation of inside shaft 104. The rotation of inside shaft 104 may cause the internal latching mechanism of door lock 134 (shown in FIG. 1B) to unlock the door lock 134. Therefore, door lock 134 can be unlocked from outside using outside handle 136 (shown in FIG. 1B).

Because inside shaft 104 can rotate independently on outside shaft 106, the mode allowing opening door lock 134 from outside does not prevent opening the door lock 134 from inside. The mechanism of opening door lock 134 from inside is described in FIG. 5.

Figure 7:
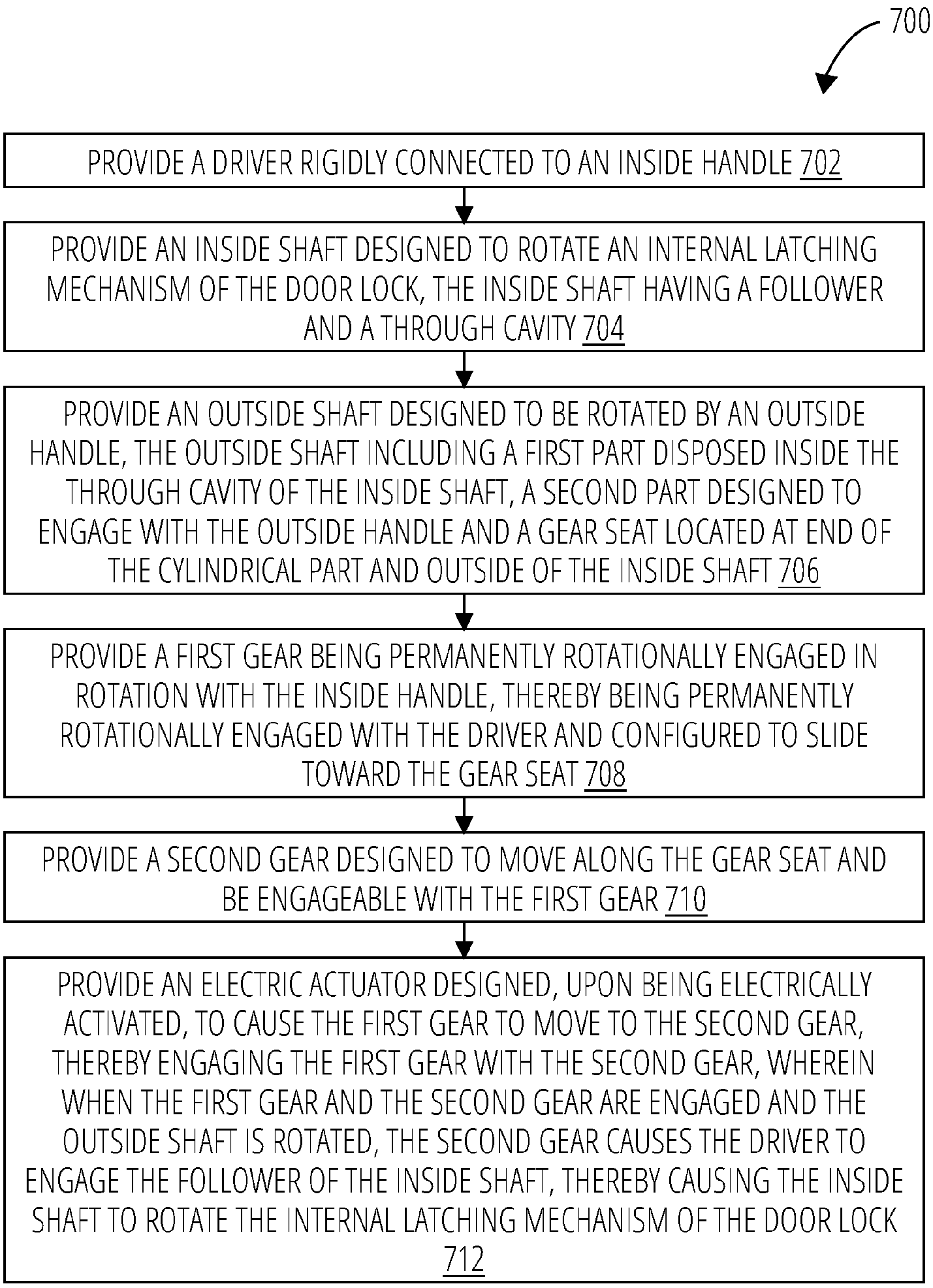
FIG. 7 illustrates a method for manufacturing an opening device for a door lock in accordance with one embodiment.

FIG. 7 illustrates method 700 for manufacturing an opening device for a door lock, in accordance with one embodiment. In some embodiments, the operations of method 700 may be combined, performed in parallel, or performed in a different order. Method 700 may also include additional or fewer operations than those illustrated.

In block 702, method 700 may include providing a driver rigidly connected to an inside handle.

In block 704, method 700 may include providing an inside shaft designed to rotate an internal latching mechanism of the door lock. The inside shaft may have a follower and a through cavity.

In block 706, method 700 may include providing an outside shaft designed to be rotated by an outside handle. The outside shaft may include a first part disposed inside the through cavity of the inside shaft, a second part designed to be engaged with the outside handle and a gear seat located at end of the first part and outside of the inside shaft.

In block 708, method 700 may include providing a first gear being permanently engaged in rotation with the inside handle, thereby being permanently engaged rotationally with the driver and configured to slide toward the gear seat.

In block 710, method 700 may include providing a second gear designed to move along the gear seat and be engageable with the first gear.

In block 712, method 700 may include providing an electric actuator designed, upon being electrically activated, to cause the first gear to move to the second gear, thereby engaging the first gear with the second gear. When the first gear and the second gear are engaged and the outside shaft is rotated, the second gear may cause the driver to engage the follower of the inside shaft, thereby causing the inside shaft to rotate the internal latching mechanism of the door lock.

The electric actuator may include a plunger designed to push the first gear toward the second gear. When the plunger has pushed the first gear toward the second gear, the electric actuator can maintain the engagement of the first gear and the second gear without further consumption of electric power. Upon being electrically deactivated, the electric actuator may allow the first gear to move away from the second gear. Method 700 may include providing a spring designed to push the first gear away from the second gear when the electric actuator is electrically deactivated. While in a deactivated state, i.e., prior to being electrically activated, the electric actuator may keep the first gear and the second gear disengaged while consuming no electric power. When the second gear is disengaged from the first gear, the driver stops to respond to the rotation of the outside shaft.

The inside handle may have an internal cavity. The electric actuator can be located within the internal cavity. The first gear can be designed to move along the internal cavity.

The electric actuator may include a latching solenoid. In other embodiments, the electric actuator may include an electric motor including a motor coil and a drive screw-and-nut system being designed to push the first gear toward the second gear.

Method 700 may include providing a dial mounted on the surface of the inside handle. Method 700 may include providing a blade located inside the internal cavity of the inside handle. Method 700 may include providing an insert located between the blade and the electric actuator within the internal cavity of the inside handle. The insert may include a sloped back side engageable with the blade. Method 700 may include connecting the dial and the blade by a rod. When the blade is rotated by the dial in a first direction, the rotation of the blade applies a pressure on the sloped back side, thereby causing the insert to move the electric actuator toward the first gear. The movement of the electric actuator, in turn, causes the first gear to engage with the second gear and allows the inside shaft to be rotated by the outside handle to unlock the door lock. The first gear and the second gear can be engaged until the blade is rotated by the dial rod in a second direction, the second direction being opposite to the first direction.

Method 700 may further include providing a rod. The outside shaft may have a further through cavity. The rod may be disposed in the further through cavity and designed to push the second gear toward the first gear when a door key is inserted into a lock-and-key mechanism integrated into the outside handle.

Figure 8:
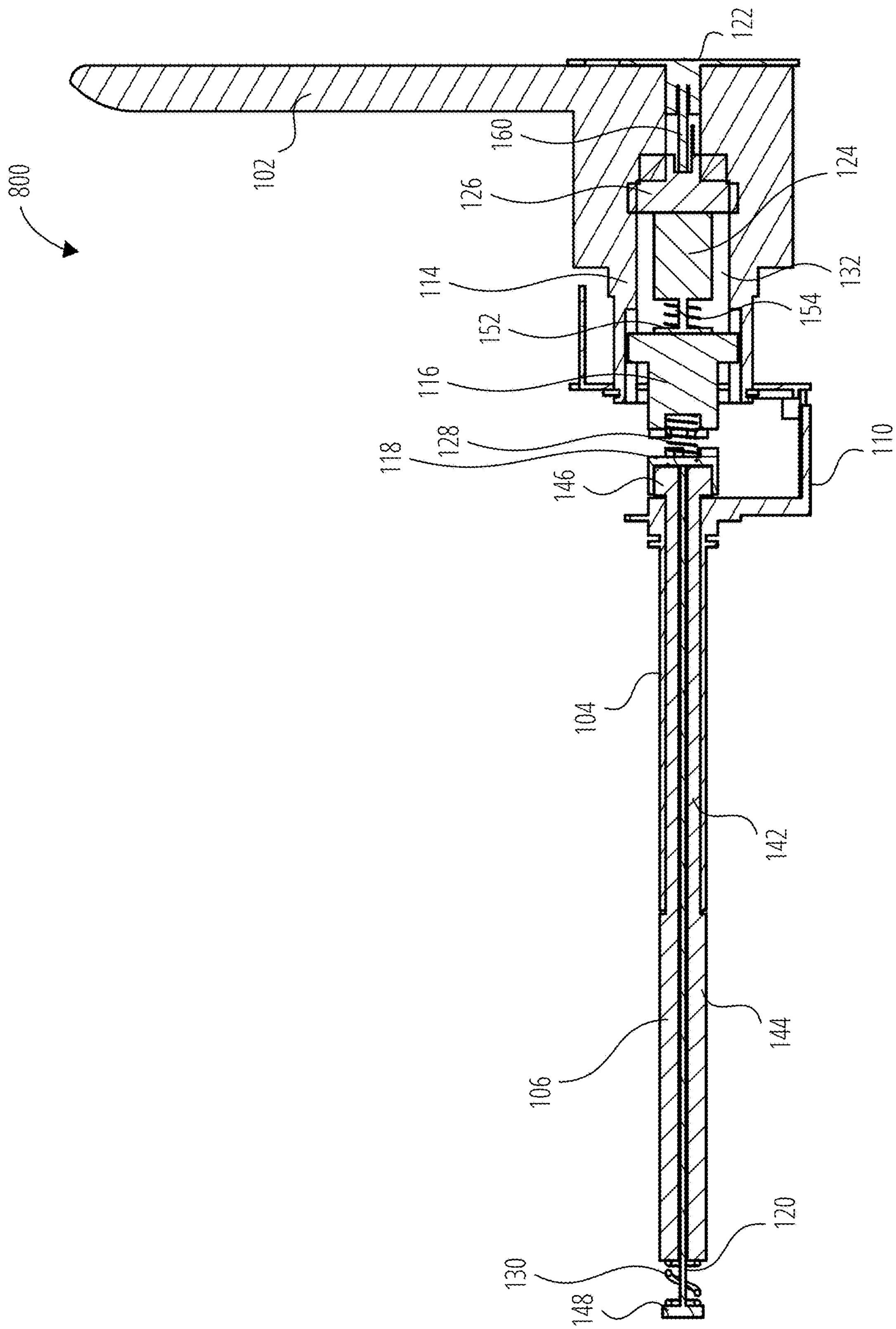
FIG. 8 is a cross-section view of an opening device, according to an example embodiment.

FIG. 8 is a cross-section view 800 of opening device 100, according to an example embodiment. FIG. 8 depicts inside handle 102, inside shaft 104, outside shaft 106, follower 110, tube 114, first gear 116, second gear 118, rod 120, control dial 122, latching solenoid 124, insert 126, spring 128, spring 130, internal cavity 132, cylindrical part 142, polyhedral part 144, gear seat 146, rod thickening 148, plunger 152, spring 154, and blade 160 described in FIG. 1A. As shown in FIG. 8, first gear 116, latching solenoid 124 (electric actuator), and insert 126 are located inside internal cavity 132 of inside handle 102. The first gear 116 can move along the internal cavity 132.

Thus, an opening device for a door lock is described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. An opening device for a door lock, the opening device comprising:
- a driver rigidly connected to an inside handle;
- an inside shaft designed to rotate an internal latching mechanism of the door lock, the inside shaft having a follower and a through cavity;
- an outside shaft designed to be rotated by an outside handle, the outside shaft including:
  - a first part disposed inside the through cavity of the inside shaft;
  - a second part designed to be engaged with the outside handle; and
  - a gear seat located at an end of the first part and outside of the inside shaft;
- a first gear being permanently rotationally engaged with the inside handle, thereby being permanently rotationally engaged with the driver and configured to slide toward the gear seat;
- a second gear designed to move along the gear seat and be engageable with the first gear; and
- an electric actuator designed:
  - upon being powered by an electric current, to cause the first gear to move to the second gear, thereby engaging the first gear with the second gear, wherein when the first gear and the second gear are engaged and the outside shaft is rotated, the second gear causes the driver to engage the follower of the inside shaft, thereby causing the inside shaft to rotate the internal latching mechanism of the door lock; and
  - to keep the first gear and the second gear engaged when the electric current powering the electric actuator is disconnected.

2. The opening device of claim 1, wherein:
- the electric actuator includes a plunger designed to push the first gear toward the second gear; and
- when the plunger has pushed the first gear toward the second gear, the electric actuator maintains the engagement of the first gear and the second gear.

3. The opening device of claim 2, wherein the electric actuator includes a latching solenoid.

4. The opening device of claim 1, wherein the electric actuator includes an electric motor including a motor coil, a nut, and a drive screw being designed to push the first gear toward the second gear.

5. The opening device of claim 1, wherein upon being electrically deactivated, the electric actuator allows the first gear to move away from the second gear.

6. The opening device of claim 5, further comprising a spring designed to push the first gear away from the second gear when the electric actuator is electrically deactivated.

7. The opening device of claim 5, wherein, while in a deactivated state, the electric actuator keeps the first gear and the second gear disengaged without further consumption of electric power.

8. The opening device of claim 1, wherein:
- the inside handle has an internal cavity;
- the electric actuator is located within the internal cavity; and
- the first gear is designed to move along the internal cavity.

9. The opening device of claim 1, further comprising:
- a dial mounted on a surface of the inside handle;
- a blade located inside an internal cavity of the inside handle;
- a rod connecting the dial and the blade; and
- an insert located between the blade and the electric actuator; and the insert includes a sloped back side engageable with the blade, wherein when the blade is rotated by the dial in a first direction:

the rotation of the blade applies a pressure on the sloped back side, thereby causing the insert to move the electric actuator toward the first gear, thereby causing the first gear to engage with the second gear and allowing the inside shaft to be rotated by the outside handle to unlock the door lock; and the first gear and the second gear are engaged until the blade is rotated by the dial in a second direction, the second direction being opposite to the first direction.

10. The opening device of claim 1, wherein when the second gear is disengaged from the first gear, the driver stops to respond to the rotation of the outside shaft.

11. The opening device of claim 1, further comprising a rod, wherein:

the outside shaft has a further through cavity; and the rod is disposed in the further through cavity and designed to push the second gear toward the first gear when a door key is inserted into a lock-and-key mechanism integrated into the outside handle.

12. A method for manufacturing an opening device for a door lock, the method comprising:

providing a driver rigidly connected to an inside handle;

providing an inside shaft designed to rotate an internal latching mechanism of the door lock, the inside shaft having a follower and a through cavity;

providing an outside shaft designed to be rotated by an outside handle, the outside shaft including a first part disposed inside the through cavity of the inside shaft, a second part designed to engage with the outside handle and a gear seat located at an end of the first part and outside of the inside shaft;

providing a first gear being permanently rotationally engaged with the inside handle, thereby being permanently rotationally engaged with the driver and configured to slide toward the gear seat;

providing a second gear designed to move along the gear seat and be engageable with the first gear; and providing an electric actuator designed:

upon being powered by an electric current, to cause the first gear to move to the second gear, thereby engaging the first gear with the second gear, wherein when the first gear and the second gear are engaged and the outside shaft is rotated, the second gear causes the driver to engage the follower of the inside shaft, thereby causing the inside shaft to rotate the internal latching mechanism of the door lock; and to keep the first gear and the second gear engaged when the electric current powering the electric actuator is disconnected.

13. The method of claim 12, wherein:

the electric actuator includes a plunger designed to push the first gear toward the second gear; and when the plunger has pushed the first gear toward the second gear, the electric actuator maintains the engagement of the first gear and the second gear.

14. The method of claim 13, wherein the electric actuator includes a latching solenoid.

15. The method of claim 12, wherein the electric actuator includes an electric motor including a motor coil, a nut, and a drive screw being designed to push the first gear toward the second gear.

16. The method of claim 12, wherein upon being electrically deactivated, the electric actuator allows the first gear to move away from the second gear.

17. The method of claim 16, further comprising providing a spring designed to push the first gear away from the second gear when the electric actuator is electrically deactivated.

18. The method of claim 16, wherein, while in a deactivated state, the electric actuator keeps the first gear and the second gear disengaged without consuming electric power.

19. The method of claim 12, wherein:

the inside handle has an internal cavity;

the electric actuator is located within the internal cavity; and the first gear is designed to move along the internal cavity.

20. The method of claim 12, further comprising:

providing a dial mounted on a surface of the inside handle;

providing a blade located inside an internal cavity of the inside handle;

providing an insert located between the blade and the electric actuator; and connecting the dial and the blade by a rod, wherein:

the insert includes a sloped back side engageable with the blade;

wherein when the blade is rotated by the dial in a first direction, the rotation of the blade applies a pressure on the sloped back side, thereby causing the insert to move the electric actuator toward the first gear, thereby causing the first gear to engage with the second gear and allowing the inside shaft to be rotated by the outside handle to unlock the door lock; and the first gear and the second gear are engaged until the blade is rotated by the dial in a second direction, the second direction being opposite to the first direction.

21. The method of claim 12, wherein when the second gear is disengaged from the first gear, the driver stops to respond to the rotation of the outside shaft.

22. The method of claim 12, further comprising providing a rod, wherein:

the outside shaft has a further through cavity; and the rod is disposed in the further through cavity and designed to push the second gear toward the first gear when a door key is inserted into a lock-and-key mechanism integrated into the outside handle.

* * * * *